United States Patent
Akutsu

Patent Number: 6,076,040
Date of Patent: Jun. 13, 2000

[54] VEHICLE RUNNING POSITION DETECTING SYSTEM

[75] Inventor: Eisaku Akutsu, Susono, Japan

[73] Assignee: Toyota Jidosha Kabushiki Kaisha, Aichi-ken, Japan

[21] Appl. No.: 08/923,004

[22] Filed: Sep. 16, 1997

[30] Foreign Application Priority Data

Sep. 27, 1996 [JP] Japan ................... 8-256395

[51] Int. Cl.[7] ................................. G05D 1/02
[52] U.S. Cl. ..................... 701/207; 701/23; 180/167
[58] Field of Search ........................... 701/23, 28, 207, 701/300, 301, 117; 180/167, 169; 340/903, 904, 905

[56] References Cited

U.S. PATENT DOCUMENTS

| | | | |
|---|---|---|---|
| 2,427,686 | 9/1947 | Muller | 250/11 |
| 2,793,363 | 5/1957 | Gray | 343/107 |
| 3,237,195 | 2/1966 | Schiffman | 343/112 |
| 3,952,309 | 4/1976 | Lammers | 348/108 R |
| 4,160,488 | 7/1979 | Blakeslee | 701/23 |
| 4,729,660 | 3/1988 | Tsumura et al. | 701/23 |
| 4,926,171 | 5/1990 | Kelley | 701/301 |
| 5,318,143 | 6/1994 | Parker et al. | 701/23 |
| 5,483,455 | 1/1996 | Lay et al. | 701/207 |
| 5,517,412 | 5/1996 | Unoura | 701/23 |
| 5,621,645 | 4/1997 | Brady | 701/117 |
| 5,790,052 | 8/1998 | Grabow | 340/928 |
| 5,875,408 | 2/1999 | Bendett et al. | 701/23 |

FOREIGN PATENT DOCUMENTS

| | | |
|---|---|---|
| 249 951 B1 | 12/1987 | European Pat. Off. . |
| 514 343 A2 | 11/1992 | European Pat. Off. . |
| 37 81 466 T2 | 12/1987 | Germany . |
| 44 39 708 A1 | 5/1996 | Germany . |
| 58-101205 | 7/1983 | Japan . |
| 1-123305 | 5/1989 | Japan . |
| 4-33099 | 2/1992 | Japan . |
| 4-293109 | 10/1992 | Japan . |

*Primary Examiner*—Gary Chin
*Attorney, Agent, or Firm*—Finnegan, Henderson, Farabow, Garrett & Dunner, L.L.P.

[57] ABSTRACT

A vehicle running position detecting system includes a receiving unit, which is mounted on a vehicle, for receiving signals transmitted from a first transmission unit and a second transmission unit which are placed so as to face each other with a lane of a road between, the first transmission unit and the second transmission unit transmitting the signals toward the lane in predetermined areas, and a position identifying unit for identifying a position of the vehicle in a width direction of the road based on states of the signals received by the receiving unit.

3 Claims, 5 Drawing Sheets

VEHICLE RUNNING POSITION DETECTING SYSTEM

BACKGROUND OF THE INVENTION

(1) Field of the Invention

The present invention generally relates to a vehicle running position detecting system, and more particularly to a vehicle running position detecting system for detecting a position, in a width direction of a road, of a vehicle moving on the road.

(2) Description of the Related Art

Conventionally, a system for detecting a position at which a vehicle travels on a road is disclosed, for example, in Japanese Laid-Open Application No.4-293109. In this system, white lines each of which indicates a boundary between lanes is recognized based on image information obtained by a video camera mounted on a vehicle. A position of the vehicle is then detected based on the recognition result.

Further, another system for detecting a running position of a vehicle has been proposed. In this system, magnetic fields generated by magnetic nails (magnets) positioned along a line on a road are detected by a magnetic sensor mounted in the vehicle. Based on detected states of the magnetic fields (e.g., detected levels of the magnetic fields), a distance (in the width direction of the road) from the line along which the vehicle should run is detected.

In the above system in which the running position of a vehicle is detected based on image information obtained from the video camera mounted in the vehicle, it is difficult to accurately recognize white lines based on the image information from the video camera at night and in bad weather conditions (e.g.,in fog or snow). Further, in the system in which the distance from the running line is detected using the magnetic fields generated by the magnetic nails positioned on the road, it is difficult to widely distribute, in the width direction of the road, each of the magnetic fields of the magnetic nails. The distance from the running line (the running position of the vehicle in the width direction of the road) which can be detected is small. Thus, the detected result can not be used as basic information for steering control in a wide range, for example, to change the running lane.

SUMMARY OF THE INVENTION

Accordingly, a general object of the present invention is to provide a novel and useful vehicle running position detecting system in which the disadvantages of the aforementioned prior art are eliminated.

A specific object of the present invention is to provide a vehicle running position detecting system in which the running position of a vehicle can be easily detected through a wide range in the width direction of the road.

The above objects of the present invention are achieved by a vehicle running position detecting system comprising: receiving means, which is mounted on a vehicle, for receiving signals transmitted from a first transmission unit and a second transmission unit which are placed so as to face each other with a lane of a road between, said first transmission unit and said second transmission unit transmitting the signals toward the lane in predetermined areas; and position identifying means for identifying a position of said vehicle in a width direction of the road based on states of the signals received by said receiving means.

In the vehicle running position detecting system according to the present invention, the state (e.g., the level) of signals received from the first transmission unit by the receiving means depends on the distance between a position at which the first transmission unit is placed and a position of the vehicle in the width direction of the road. The state of signals received from the second transmission unit by the receiving means depends on the distance between a position at which the second transmission unit is placed and the position of the vehicle in the width direction of the road. Thus, the position of the vehicle in the width direction of the road is specified based on the states of the signals received by the receiving means.

According to the present invention, since the position of the vehicle in the width direction of the road is specified based on the states of the signals transmitted from external units, the running position of the vehicle in the width direction of the road can be easily detected in a wide range.

The signals transmitted from the first and second transmission units may be a radio wave, light signals or ultrasonic signals.

In order to continuously detect running positions of the vehicle, a plurality of first transmission units and a corresponding plurality of second transmission units may be arranged at predetermined intervals along the lane.

In order to obtain other information required for a running control of the vehicle based on the signals received from the first and second transmission units by the receiving means, the vehicle running position detecting system described above may further comprise Doppler component detecting means for detecting a Doppler frequency component of each of the signals received from said first transmission unit and said second transmission unit by said receiving means; and calculation means for calculating a velocity of said vehicle with respect to the road based on the Doppler frequency component of each of the signals detected by said Doppler component detecting means.

The vehicle runs at a resultant velocity of the velocity components in directions from the vehicle towards the first and second transmission units. The frequency of each of the signals received from the first and second transmission units by the receiving means is shifted based on a corresponding one of the velocity components (the Doppler shift). The Doppler frequency component (the shifted frequency) corresponds to a velocity component in a corresponding direction. Thus, the velocity of the vehicle with respect to the road is calculated based on the Doppler frequency component in each of the directions.

The velocity of the vehicle with respect to the road may be used for the running control (an acceleration control, a braking control and the like) of the vehicle.

In addition, the vehicle running position detecting system described above may further comprise signal storage means for storing at least one of the signals received from said first transmission unit and said second transmission unit by said receiving means; and detecting means for detecting variation of an environment of said vehicle based on variation of the signal stored in said storage means.

In such a system, the states of the signals received from the first and second transmission units by the receiving means depends on the vehicle environment (fog, snow, rain or the like). Thus, when the environment of the vehicle is changed, the states of the signals received by the receiving means are changed. The variation of the vehicle environment is detected based on the variation of the signals stored in the storage means.

The variation of the vehicle environment may be used for a running control of the vehicle as follows.

When start of rain or snow is detected, the velocity of the vehicle may be decreased or the driving system may be changed from two wheel drive (2WD) to four wheel drive (4WD). When fog is detected, fog lamps may be turned on.

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBODIMENTS

A description will be given of an embodiment of the present invention with reference to the drawings.

Figure 1:
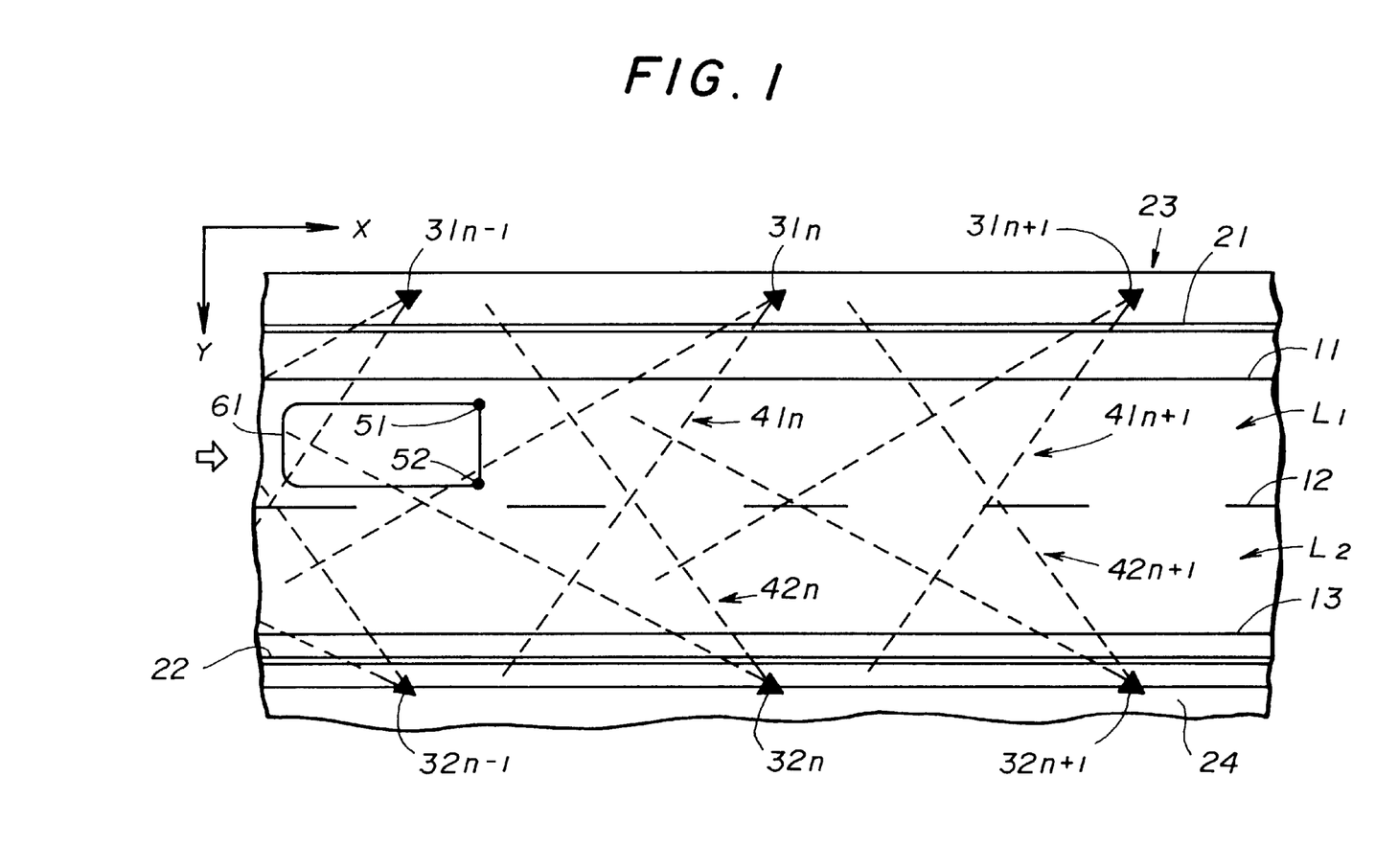
FIG. 1 is a diagram illustrating an example of an arrangement of transmitters used in a vehicle running position detecting system according to an embodiment of the present invention.

FIG. 1 shows lanes on a left side of a road. In FIG. 1, two lanes L1 and L2 which are separated by lane marks 11, 12 and 13 are formed between a left end road side 23 and a median strip 24. A guardrail 21 is placed between the road side 23 and the outer lane mark 11. Outside of the guardrail 21, first transmitters $31_{n-1}$, $31_n$, $31_{n+1}$, ... are placed along the road at predetermined intervals (e.g., about 50 meters in the same manner as delineators). A guardrail 22 is placed between the inner lane mark 13 and the median strip 24. In the median strip 24 in the outside of the guardrail 22, second transmitters $32_{n-1}$, $32_n$, $32_{n+1}$, ... are placed along the road at the same intervals as the first transmitters $31_{n-1}$, $31_n$, $31_{n+1}$, ....

A first transmitter $31_i$ and a second transmitter $32_i$ (i= ..., n-1, n, n+1, ...), which face each other with the lanes L1 and L2 between, are paired with each other. The first transmitter $31_i$ transmits signals from the road side toward the lanes L1 and L2 so that the signals can be received in a transmission area $41_i$ on the lanes L1 and L2. The second transmitter $32_i$ transmits signals from the median strip 24 toward the lanes L1 and L2 so that the signals can be received in a transmission area $42_i$. The transmission areas $41_i$ and $42_i$ for the first and second transmitters $31_i$ and $32_i$ which are paired with each other are spread in directions so that the signals can be detected by sensors provided on the front surface of a vehicle running on the road. In addition, the respective transmission areas 41 and 42 are substantially symmetrical with respect to the lane mark 12 placed in the boundary between the lanes L1 and L2.

Each of the first and second transmitters $31_i$ and $32_i$ modulates signals having a predetermined frequency using data (including information regarding a position along the road) in accordance with a predetermined rule and transmits the modulated signals.

Figure 2:
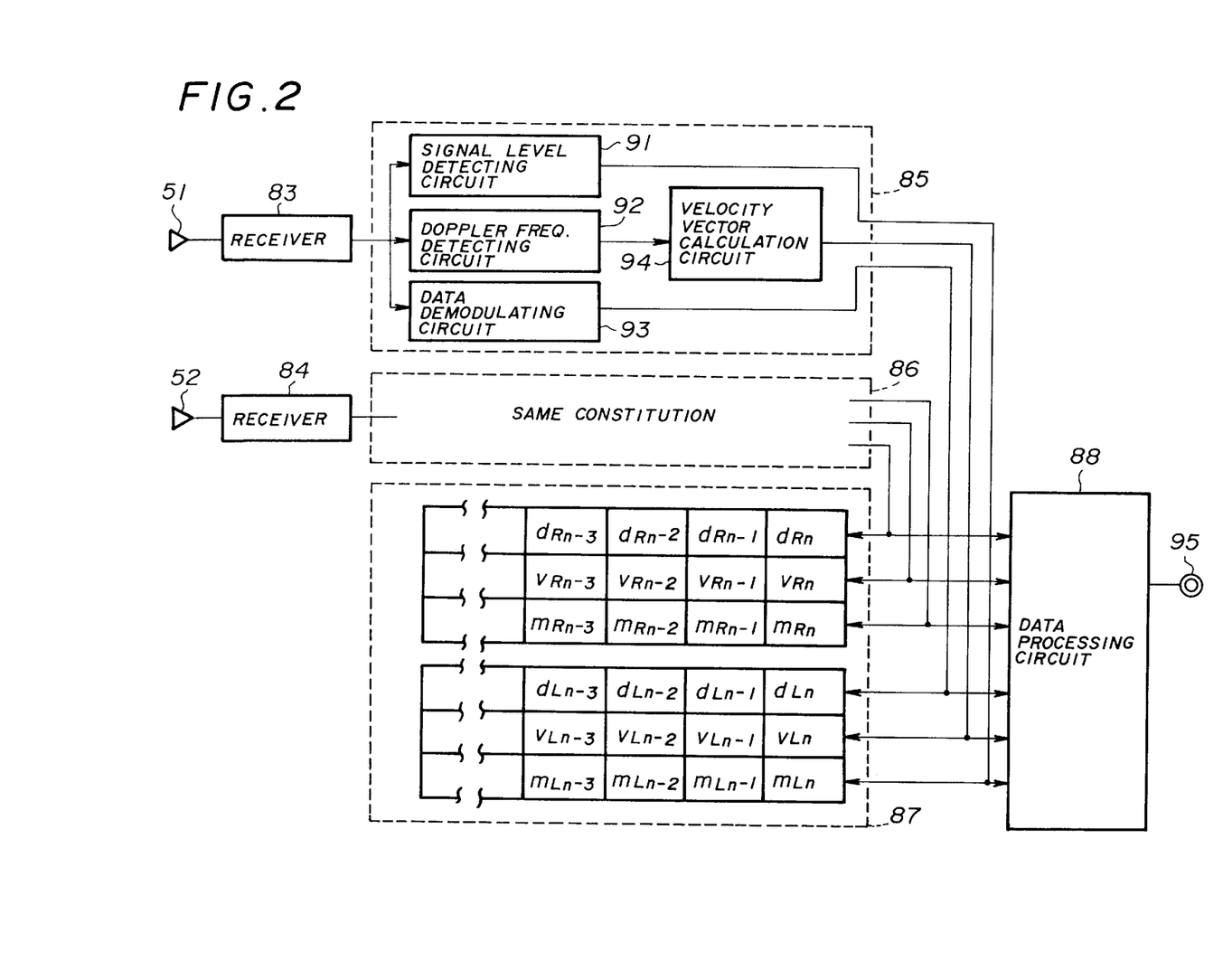
FIG. 2 is a block diagram illustrating a constitution of the vehicle running position detecting system according to the embodiment of the present invention.

A vehicle 61 which runs in each lane on the road on which the transmitters are placed as described above has a running position detecting apparatus as shown in FIG. 2. In FIG. 2, the running position detecting apparatus has a first sensor 51 which is mounted on the left side of the front surface of the vehicle 61 (see FIG. 1), a first receiver 83 and a first processing circuit 85. The first sensor 51 receives signals transmitted from the first transmitter $31_i$ placed on the road side as described above. The received signals are processed (amplified, demodulated and the like) by the first receiver 83. The signals from the first receiver 83 are further processed by the first signal processing circuit 85.

The first signal processing circuit 85 has a signal level detecting circuit 91, a Doppler frequency detecting circuit 92, a data demodulating circuit 93 and a velocity vector calculation circuit 94. The signal level detecting circuit 91 detects the amplitude level $m_{Ln}$ of the signal from the receiver 83. The Doppler frequency detecting circuit 92 detects a Doppler frequency corresponding to a difference between frequencies of a transmission signal and a received signal. The velocity vector calculation circuit 94 calculates, based on the detected Doppler frequency, a velocity component $V_{Ln}$ (a velocity vector) of a vehicle in a direction toward the first transmitter $31_i$ which transmits signals. The data demodulating circuit 93 demodulates various kinds of data $d_{Ln}$ (including, e.g., a position of the first transmitter $31_i$ in a direction along the road) from the received signals.

This running position detecting apparatus further has a second sensor 52 mounted on the right side of the front surface of the vehicle 61 (see FIG. 1), a second receiver 84 and a second signal processing circuit 86. The signals transmitted from the second transmitter $32_i$ placed on the median strip 24 as described above are detected by the second sensor 52. The received signals are processed (amplified, demodulated and the like) by the second receiver 84. The signals output from the second receiver 84 are then processed by the second signal processing circuit 86.

The second signal processing circuit 86 has a signal level detecting circuit, a Doppler frequency detecting circuit, a data demodulating circuit and a velocity vector calculation circuit in the same manner as the first signal processing circuit 85. The amplitude level $m_{Rn}$ of the received signal from the receiver 84 and a velocity component $V_{Rn}$ (a velocity vector) of a vehicle in a direction toward the second transmitter $32_i$, which transmits signals, are generated. Various kinds of data $d_{Rn}$ (including, e.g., a position of the second transmitter $32_i$ in a direction along the road) are demodulated from the received signals.

The running position detecting apparatus further has a storage unit 87 and a data processing circuit 88. The amplitude level $m_{Ln}$ of the received signal, the velocity vector component $V_{Ln}$ and the demodulated data $d_{Ln}$ all of which are output from the first signal processing circuit 85 are stored in the storage unit 87 at predetermined timings. The amplitude level $m_{Rn}$ of the received signal, the velocity vector component $V_{Rn}$ and the demodulated data $d_{Rn}$ all of which are output from the second signal processing circuit 86 are also stored in the storage unit 87 at predetermined timings. That is, the storage unit 87 stores a data set ($m_{Ln}$, $V_{Ln}$ and $d_{Ln}$) from the first signal processing circuit 85 and a data set ($m_{Rn}$, $V_{Rn}$ and $d_{Rn}$) from the second signal processing circuit 86 in a first-in-first-out manner. A predetermined number of data sets are stored in the storage unit 87.

The data processing circuit 88 includes a function for calculating a position of a vehicle in the width direction of the road, a function for calculating a velocity of a vehicle with respect to the road and a function for determining how the vehicle environment has been changed. That is, based on the amplitude level $m_{Ln}$ of the received signal from the first signal processing circuit 85 and the amplitude level $m_{Rn}$ of the received signal from the second signal processing circuit 86, a position of the vehicle in the width direction of the road is calculated (the detailed description will be given later). Based on the velocity vector $V_{Ln}$ from the first signal processing circuit 85 and the velocity vector $V_{Rn}$ from the second signal processing circuit 86, the velocity of the vehicle with respect to the road is calculated (the detailed description will be given later). In addition, based on variations of the amplitude levels $m_{Ln}$, $m_{Ln-1}$, . . . and $m_{Rn}$, $m_{Rn-1}$, . . . stored in the storage unit 87, it is determined how the vehicle environment has been changed (the detailed description will be given later).

First, a position of the vehicle in the width direction of the road is calculated as follows.

For example, vehicle 61 is running in the lane L1 on the left side of the road as show in FIG. 1. In this case, the distance from the second transmitter $32_i$ to the second sensor 52 mounted on the right side of the front surface of the vehicle 61 is greater than the distance from the first transmitter $31_i$ to the first sensor 51 mounted on the left side of the front surface of the vehicle 61. Thus, the length which the second sensor 52 moves in the radiated transmission area $42_i$ of the second transmitter $32_i$ is greater than the length which the first sensor 51 moves in the radiated transmission area $41_i$ of the first transmitter $31_i$. Further, the level of the signal received by the second sensor 52 is less than the level of the signal received by the first sensor 51. The levels of the signals received by the respective sensors 51 and 52 depend on a position of the vehicle 61 in the width direction (the Y-direction) of the road.

Figure 3A:
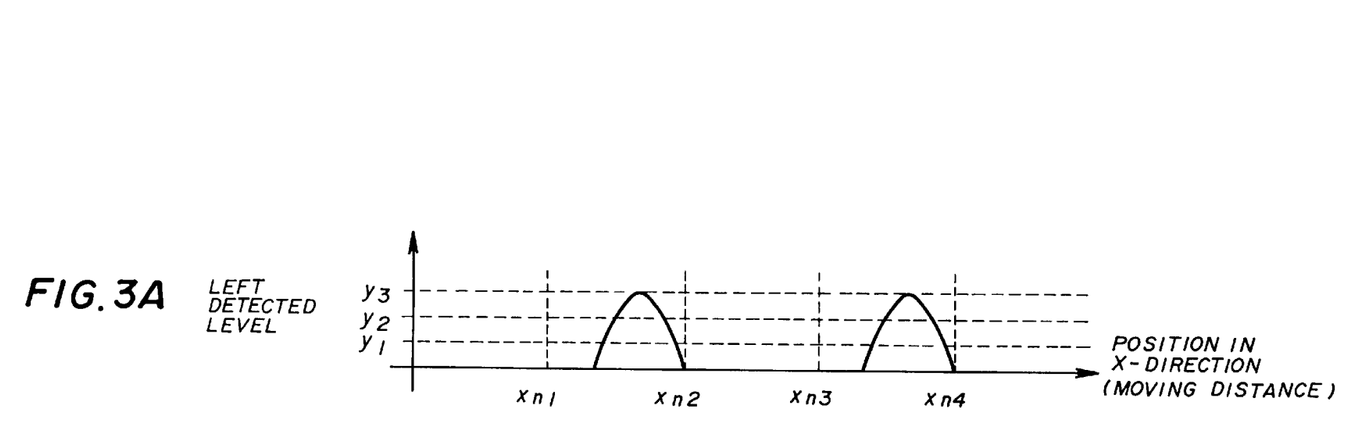
FIGS. 3A and 3B are diagrams illustrating states of detecting levels in first and second sensors.
Figure 3B:
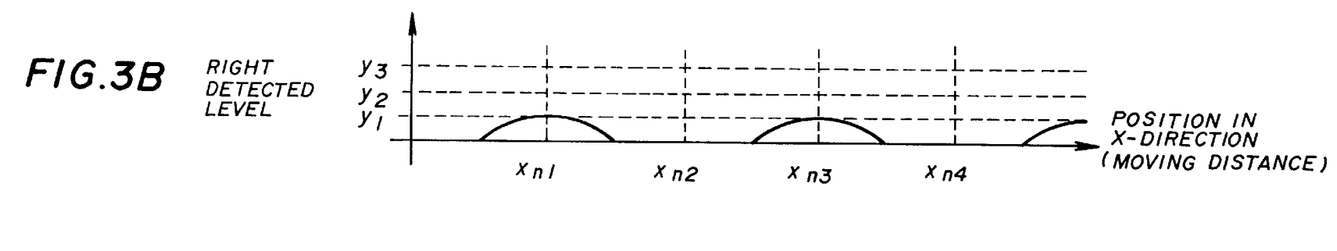

In addition, while the vehicle 61 is running in the lane L1 on the left side of the road, the second sensor 52 enters the transmission area $42_i$ of the second transmitter $32_i$ and the first sensor 51 then enters the transmission area $41_i$ of the first transmitter $31_i$. As a result, while the vehicle 61 is running in the lane L1, the detected signals from the first and second sensors 51 and 52 respectively have wave forms as shown in FIGS. 3A and 3B. That is, the detected signals from the second sensor 52 have, as shown in FIG. 3B, relatively broad wave forms in which peaks having a level y1 are located at positions $X_{n1}$, $X_{n3}$ . . . in a direction (the X-direction) along the road. The detected signals from the first sensor 51 have, as shown in FIG. 3A, relatively sharp wave forms in which peaks having a level y3 (>y1) are located between positions $X_{n1}$ and $X_{n2}$, between positions $X_{n3}$ and $X_{n4}$, . . . in the direction (the X-direction) along the road.

Figure 4:
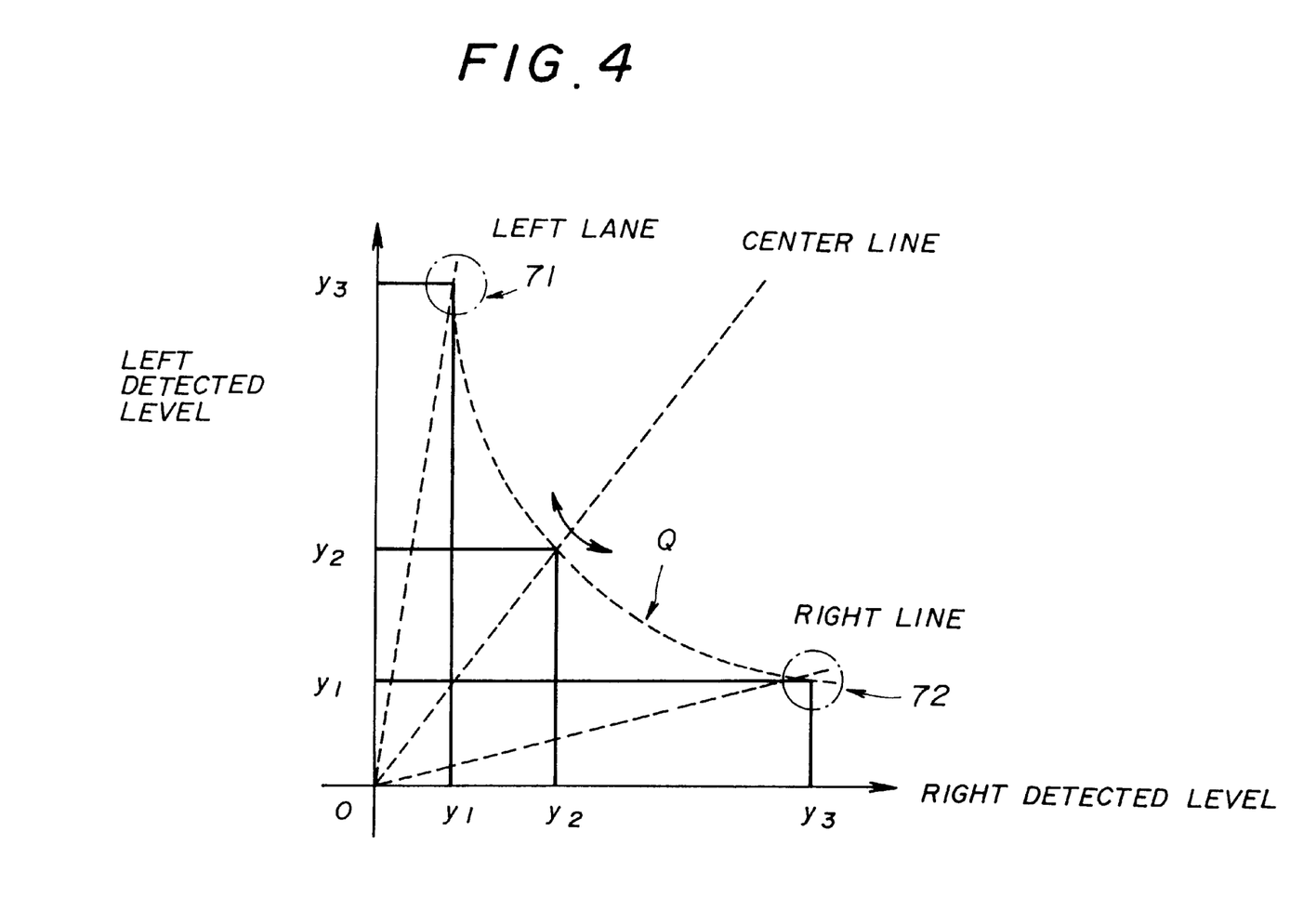
FIG. 4 is a characteristic diagram illustrating a relationship between the detecting levels of the first and second sensors.

The level of the detected signal from the first sensor 51 (a left detected level) and the level of the detected signal from the second sensor 52 (a right detected level) depend on a position of the vehicle in the width direction (the Y-direction) of the road. The levels of the respective detected signals (the left detected level and the right detected level) vary in accordance with a characteristic as shown in FIG. 4. Due to transmission characteristic in each of the transmission areas $41_i$ and $42_i$ of the first and second transmitters $31_i$ and $32_i$, the level of the transmission signal is in inverse proportion to a value which is in a range between the second power of the distance from the transmitter and the third power of thereof. Thus, a point indicated by a pair of the left detected level (the level of the detected signal from the first sensor 51) and the right detected level (the level of the detected signal from the second sensor 51) moves, as shown in FIG. 4, on a substantially hyperbolic curve Q in accordance with the position in the width direction (the Y-direction) of the road.

In FIG. 4, when the vehicle 61 runs in the lane L1 close to the road side 23, the left detected level and the right detected level are varied in an area 71 in accordance with the lateral displacement (in the Y-direction) of the vehicle 61 based on the steering operation. The area 71 includes a point having a large left detected level (y3) and a small right detected level (y1) on the hyperbolic curve Q. In addition, when the vehicle 61 runs in the lane L2 close to the median strip 24, the left detected level and the right detected level are varied in an area 72 in accordance with the lateral displacement of the vehicle 61 based on the steering operation. The area 72 includes a point having a small left detected level (y1) and a large right detected level (y3) on the hyperbolic curve Q. When the vehicle 61 runs on a boundary area (including the lane mark 12) between the lanes L1 and L2, the left detected level and the right detected level are varied in an area in accordance with the lateral displacement of the vehicle 61 based on the steering operation. The area includes a point in which the left detected level (y2) is substantially equal to the right detected level (y2) on the hyperbolic curve Q.

As has been described above, the left and right detected levels paired with each other are varied in accordance with the position of the vehicle in the width direction (the Y-direction). Thus, the data processing circuit 88 (see FIG. 2) has a table indicating a relationship between a set of the amplitude levels $m_{Ln}$ and $m_{Rn}$ of the received signals (output from the first and second signal processing circuits 85 and 86) and a position of the vehicle in the width direction of the road. The amplitude levels $m_{Ln}$ and $m_{Rn}$ respectively correspond to the left and the right detected level. The set of the amplitude levels $m_{Ln}$ and $m_{Rn}$ corresponds to a point on the hyperbolic curve Q shown in FIG. 4. Every time the data processing circuit 88 receives the amplitude levels ($m_{Ln}$, $m_{Rn}$) of signals from the first and second signal processing circuits 85 and 86, the data processing circuit 88 specifies, with reference to the table, a position corresponding to the set of the amplitude levels ($m_{Ln}$, $m_{Rn}$). Position data indicating the identified position is supplied from the data processing circuit 88 to, for example, a running control system via an output terminal 95.

The running control system, for example, controls a vehicle based on the position data so that the vehicle automatically runs in the specific lane L1. In addition, it can be determined based on the position data whether the vehicle has changed lanes.

The first and second sensors 51 and 52 mounted on the vehicle 61 respectively receive signals from the first and second transmitters $31_i$ and $32_i$ while moving at relative velocities with respect to the first and second transmitters $31_i$ and $32_i$. Thus, the frequency of the detected signal from each of the first and second sensors 51 and 52 differs from the frequency of the transmitted signal due to a Doppler-shift based on the relative velocity. The Doppler frequency component corresponding to the frequency variation of each signal is changed into a velocity component in a direction toward each of the first and second transmitters $31_i$ and $32_i$ in accordance with the following equation.

$$f_d = f_s \cdot c/(c - v_s')$$

$f_d$: Doppler frequency component
fs: transmission frequency c: propagation velocity of the transmission wave $v_s'$: relative velocity (velocity component)

That is, in each of the first and second signal processing circuit 85 and 86, the Doppler frequency detected by the Doppler frequency detecting circuit 92 is converted, in accordance with the above equation, into a velocity component (a left detected velocity vector) $V_{L \times n}$ in a direction toward the first transmitter $31_i$ and a velocity component (a right detected velocity vector) $V_{R \times n}$ in a direction toward the second transmitter $32_i$.

Figure 5:
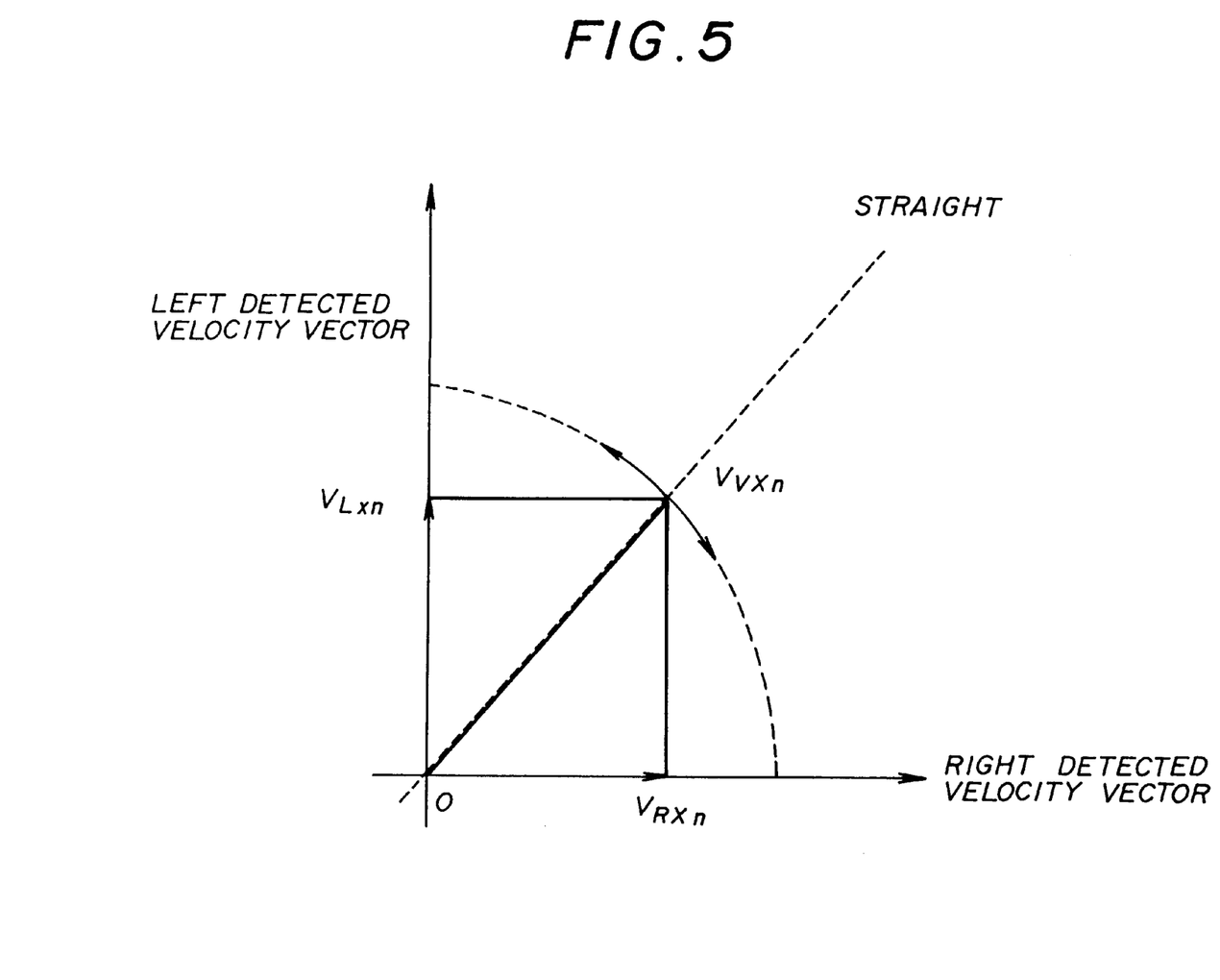
FIG. 5 is a diagram illustrating detected velocity vectors in respective directions and a resultant velocity vector.

The resultant vector $V_{v \times n}$ (see FIG. 5) of the left detected velocity vector $V_{L \times n}$ and the right detected velocity vector $V_{R \times n}$ represents a velocity vector of the vehicle 61. While the vehicle 61 is running at a constant velocity, the resultant vector $V_{v \times n}$ is, as shown in FIG. 5, a vector extending from an origin O to a point on a circle having a radius corresponding to an absolute value of the velocity. In a case where the vehicle is running straight, the relative velocity of the first sensor 51 with respect to the first transmitter $31_i$ is equal to the relative velocity of the second sensor 52 with respect to the second transmitter $32_i$. In this case, the absolute value of the left detected velocity vector $V_{L \times n}$ and the absolute value of the right detected velocity vector $V_{R \times n}$ are equal to each other. As a result, the resultant vector $V_{v \times n}$ (the velocity vector of the vehicle 61) of these vectors is, as shown in FIG. 5, on a line which divides an angle between the left detected velocity vector $V_{L \times n}$ and the right detected velocity vector $V_{R \times n}$ in half.

The data processing circuit (see FIG. 2) calculates the resultant vector $V_{v \times n}$ using the left detected velocity vector $V_{L \times n}$ and the right detected velocity vector $V_{R \times n}$. The left detected velocity vector $V_{L \times n}$ and the right detected velocity vector $V_{R \times n}$ are respectively output from the velocity vector calculation circuits 94 of the first and second signal processing circuit 85 and 86. The data processing circuit 88 then specifies a heading angle of the vehicle 61 based on the direction of the resultant vector $V_{v \times n}$ corresponding to the velocity vector of the vehicle 61. The data processing circuit 88 further specifies the velocity of the vehicle 61 with respect to the road based on the absolute value of the resultant vector $V_{v \times n}$. The data representing the heading angle and the velocity with respect to the road is supplied from the data processing circuit 88 to the running control system via the output terminal 95.

In the running control system which receives the data representing the heading angle and the velocity with respect to the road, a steering control, a velocity control and the like are performed based on the received data.

Further, the vehicle environment (fog, snow, rain and the like) is determined as follows.

The first and second transmitter $31_i$ and $32_i$ which pair with each other can be identified based on the position information included in the transmission signal. The position information represents a position in a direction along the road. Based on data $d_{Li}$ and $d_{Ri}$ (i=n, n–1, ... ) including the position information, the data processing circuit 88 identifies, among the amplitude data items stored in the storage unit 87, amplitude levels $m_{Li}$ and $m_{Ri}$ of the received signals corresponding to the transmission signals from the first and second transmitters $31_i$ and $32_i$. Each pair of amplitude levels of the received signals stored in the storage unit 87 (data detected in the past) and a corresponding pair of amplitude levels of the currently received signals are then compared with each other. It is determined, based on the comparison result, whether the amplitude level of the received signal is increased with respect to time. Further, a correction process for eliminating a variation part corresponding to the heading angle based on the velocity vectors $V_{Ln}$ and $V_{Rn}$ from the variation (increase or decrease) of each of the amplitude levels is performed. Based on the variation of each of the amplitude levels which is obtained after the correction process is performed, the data processing circuit 88 determines the environment in which the vehicle exists.

If the amplitude level is decreased, it can be estimated that signals from the respective transmitters are absorbed in the rain, fog, snow or the like. In this case, the data processing circuit 88 determines that the weather is bad. The determination result is supplied from the data processing circuit 88 to the running control system via the output terminal 95.

In the running control system, based on the determination result, for example, the drive system may be changed from two wheel drive (2WD) to four wheel drive (4WD).

Based on the decreasing pattern of the amplitude level (the decreasing amount of the amplitude level), the cause of the amplitude level decrease can be determined, i.e., rain, snow or fog.

In a case where ultrasonic signals are transmitted from the respective transmitters, it is preferable that temperature compensation is applied to the calculation of the variation of the amplitude level.

In the system as described above, a position of the vehicle in the width direction (the Y-direction) of the road is detected based on receiving states of signals from the first and second transmitters which are placed so as to face each other with the lanes L1 and L2 between. In addition, the velocity of the vehicle with respect to the road is calculated based on the Doppler frequencies obtained from the respective received signals. Further, the variation of the vehicle environment (rain, snow, fog or the like) is determined based on varying the amplitude level of the received signal with the passage of time.

The present invention is not limited to the aforementioned embodiment, and other variations and modifications may be made without departing from the scope of the claimed invention.

What is claimed is:

1. A vehicle running position detecting system comprising:

receiving means mounted on a vehicle for receiving signals transmitted from a first transmission unit and a second transmission unit placed so as to face each other with a lane of a road between, said first transmission unit and said second transmission unit transmitting the signals toward the lane in predetermined areas of the lane; and position identifying means for identifying a position of said vehicle in a width direction of the road based on states of the signals received by said receiving means, said position identifying means comprising:

first means for detecting a level of the signal received from said first transmission unit by said receiving means;

second means for detecting a level of the signal received from said second transmission unit by said receiving means; and third means for determining the position of the vehicle based on the levels of the signals detected by said first means and said second means, wherein said third means includes a table indicating a relationship between a set of levels detected by said first means and said second means and a position of the vehicle in the width direction of the road, said third means determining, with reference to the table, the position corresponding to a set of levels detected by said first means and said second means.

2. A vehicle running position detecting system comprising:

receiving means mounted on a vehicle for receiving signals transmitted from a first transmission unit and a second transmission unit placed so as to face each other with a lane of a road between, said first transmission unit and said second transmission unit transmitting the signals toward the lane in predetermined areas of the lane;

position identifying means for identifying a position of said vehicle in a width direction of the road based on states of the signals received by said receiving means;

Doppler component detecting means for detecting a Doppler frequency component of each of the signals received from said first transmission unit and said second transmission unit by said receiving means; and calculation means for calculating a velocity of said vehicle with respect to the road based on the Doppler frequency component of each of the signals detected by said Doppler component detecting means.

3. A vehicle running position detecting system comprising:

receiving means mounted on a vehicle for receiving signals transmitted from a first transmission unit and a second transmission unit placed so as to face each other with a lane of a road between, said first transmission unit and said second transmission unit transmitting the signals toward the lane in predetermined areas of the lane;

position identifying means for identifying a position of said vehicle in a width direction of the road based on states of the signals received by said receiving means;

signal storage means for storing at least one of the signals received from said first transmission unit and said second transmission unit by said receiving means; and detecting means for detecting variation of vehicle environment based on variation of said one of the signals stored in said storage means.

* * * * *